United States Patent [19]
Wolf

[11] Patent Number: 5,381,335
[45] Date of Patent: Jan. 10, 1995

[54] DEVICE FOR CONTROLLING A VEHICLE COMPONENT IN DEPENDENCE UPON TRANSVERSE ACCELERATION

[75] Inventor: Fritz Wolf, Bergrheinfeld, Germany

[73] Assignee: Fichtel & Sachs AG, Schweinfurt, Germany

[21] Appl. No.: 923,321

[22] Filed: Jul. 31, 1992

[30] Foreign Application Priority Data

Aug. 7, 1991 [DE] Germany .............................. 4126078

[51] Int. Cl.⁶ .............................................. B62D 7/16
[52] U.S. Cl. .......................... 364/424.05; 364/426.01; 364/434; 280/707
[58] Field of Search ...................... 364/426.01, 426.02, 364/426.03, 434, 424.05; 280/707

[56] References Cited

U.S. PATENT DOCUMENTS

| | | | |
|---|---|---|---|
| 3,980,346 | 9/1976 | Leiber | 303/6 R |
| 4,433,857 | 2/1984 | Zwalve | 280/690 |
| 4,621,833 | 11/1986 | Soltis | 280/707 |
| 4,717,175 | 1/1988 | Arai et al. | 280/96.1 |

FOREIGN PATENT DOCUMENTS

| | | |
|---|---|---|
| 0224036 | 6/1987 | European Pat. Off. . |
| 0234552 | 9/1987 | European Pat. Off. . |
| 0364965 | 4/1990 | European Pat. Off. . |
| 0412530 | 2/1991 | European Pat. Off. . |
| 0227343 | 3/1992 | European Pat. Off. . |
| 3541229 | 5/1986 | Germany . |
| 4010277 | 10/1990 | Germany . |
| 59-160614 | 9/1984 | Japan . |

OTHER PUBLICATIONS

A. Zomotor, "Fahrwerktechnik: Fahrverhalten", Vogel, 1987, pp. 100–105.

*Primary Examiner*—Kevin J. Teska
*Assistant Examiner*—Stephen J. Walder, Jr.
*Attorney, Agent, or Firm*—Brumbaugh, Graves, Donohue & Raymond

[57] ABSTRACT

A device is proposed for the control of a transverse-acceleration-dependent vehicle component, particularly a shock-absorber, dependent upon a control signal representing the transverse acceleration and obtained by means of a computer. In the device of the invention the computer is supplied by a tachogenerator responding to the vehicle speed and by a steering angle sensor responding to a steering lock. The computer is designed for obtaining the control signal taking into consideration values specific to the vehicle, such as mass of the vehicle, wheel suspension rigidity and the like.

2 Claims, 4 Drawing Sheets

DEVICE FOR CONTROLLING A VEHICLE COMPONENT IN DEPENDENCE UPON TRANSVERSE ACCELERATION

BACKGROUND OF THE INVENTION

The invention relates to a device for controlling a vehicle component alterable dependent on transverse acceleration, particularly a shock absorber, depending upon a control signal which represents the transverse acceleration and has been acquired by a computer, the said computer being supplied by a tachogenerator responding to the vehicle travelling speed and by a steering angle sensor responding to the steering lock.

Such devices are used, for example, for the regulation of the chassis of a motor vehicle (adjustable shock absorbers of an active chassis). A partial aspect of such a chassis regulation is to counter-act rolling motions of the vehicle, i.e. rocking motions of the vehicle around its longitudinal axis, for example as a result of fast cornering. With this system, the knowledge of the value of the transverse acceleration brought about on the vehicle by centrifugal forces permits a detection of the rolling, even before great rolling angles of the vehicle have occurred, and thus a derivative rolling compensation within a regulation strategy for the chassis.

In principle, a direct detection of the value of transverse acceleration by means of a transverse acceleration sensor is conceivable. The detection of the value of transverse acceleration in a computer from the value of a vehicle speed detected by a tachogenerator and the value of a steering angle detected by a steering angle sensor, however, has the advantage that the rolling of the vehicle generally can be detected even earlier.

STATEMENT OF THE PRIOR ART

A device of the generic type is known in which the computer is designed for the determination of the value of the transverse acceleration from the vehicle speed and the steering angle according to Ackermann's formula. Ackermann's formula is based on the calculation of transverse acceleration from the centrifugal force acting upon the vehicle in circular drive, the radius of the circular path being calculated from the value of the steering angle. When deriving Ackermann's formula it is pre-supposed that the wheels of the motor vehicle roll without skid on the roadway.

Ackermann's formula is as follows:

$$y = \frac{\beta \cdot v^2}{i \cdot L}$$

In which formula y is the value of the control signal representing the transverse acceleration, $\beta$ the steering angle, v the vehicle speed, i the steering reduction ratio and L the wheelbase of the motor vehicle.

However, it is known that the wheels of a vehicle moving at high speed on a circular path no longer roll free from skid but in slanting directions relative to the circular path in an outward drift (cf. for example, A. Zomotor "Fahrwerktechnik: Fahrverhalten", Vogel, 1987-chapter 4.2). The consequence of this is that the transverse acceleration determined by means of Ackermann's formula can deviate considerably from the transverse acceleration effectively taking place. As for the compensation of the drift a greater steering lock is required and thus the radius of the actual circular path is greater than the path radius corresponding to the steering angle, the transverse acceleration values computed by means of Ackermann's formula are too high in the case of the higher vehicle speeds. In practice this leads to the situation that the chassis regulation, because of unreliable transverse acceleration data, does not counteract the rolling of the vehicle with the necessary precision.

A further drawback of chassis regulation using a value obtained on the basis of the Ackermann's formula for transverse acceleration is that it does not take into consideration important data specific to the vehicle, such as, for example, the mass of the vehicle, tire characteristic diagrams, wheel suspension rigidity or the like. Precisely the values specific to the vehicle which have just been mentioned actually have an influence upon the value of the angle of slanting motion on circular drive at high speed.

OBJECT OF THE INVENTION

As opposed to this, it is the object of the invention to provide a device of the generic type which makes it possible to counteract rolling motions of the vehicle in precise manner even at high vehicle speeds.

SUMMARY OF THE INVENTION

This object is achieved in that the computer is set for the determination of the control signal according to the formula $$y = \beta \cdot \frac{1}{i \cdot (k + L/v^2)} \quad (I)$$

in which formula y is the value of the control signal representing the transverse acceleration, $\beta$ the steering angle, v the vehicle speed and i, k and L are constants specific to the vehicle. As the square of the vehicle speed in the denominator of this formula goes into a sum, the transverse acceleration "y" computed according to this formula increases with increasing vehicle speed "v" more slowly than the transverse acceleration computed according to Ackermann's formula. In the second summand of this sum, constant "k", there enter values specific to the vehicle, such as, for example, mass of the vehicle, tire characteristic diagrams, wheel suspension rigidity and the like, so that the device of the invention, by means of the suitable selection of the constant "k" can be directly adapted to various vehicle types and various vehicle equipments. The constant "k" can in this system either be preset by the vehicle manufacturer or modified by the driver of the vehicle by means of a switch, e.g., taking the loading condition of the vehicle into consideration.

So as to be able to react sufficiently quickly to the transverse acceleration occurring with sudden steering movements, it is proposed that the vehicle component should be additionally controlled depending on a further control signal representing the transverse jolt. By "transverse jolt" a value is understood which takes into consideration at least approximately the derivation of the transverse acceleration according to time.

In this connection the further control signal "z" can be determined in a computer on the basis of the formula:

$$z = \frac{1}{i \cdot (k + L/v^2)} \cdot \left[ \left( \frac{d\beta}{dt} \right) + \left( \frac{dv}{dt} \right) \cdot \frac{2 \cdot L \cdot \beta}{v^3 \cdot (k + L/v^2)} \right]$$

using a differential element for the determination of the time derivation of the steering angle and using a further differential element for the determination of the time derivation of the vehicle speed. By this means a precise acquisition of the transverse jolt is made possible, as both alterations of the steering angle and also alterations of the vehicle speed, e.g. as a result of braking on a bend, are taken into consideration. The acquisition of the transverse jolt can take place simultaneously with the determination of the transverse acceleration.

Alternatively, the further control signal $z'$ can be obtained in a computer according to the formula:

$$z' = \left( \frac{d\beta}{dt} \right) \cdot \frac{1}{i \cdot (k + L/v^2)}$$

using a differential element for the determination of the time derivation of the steering angle. The simpler formula permits a faster determination of transverse acceleration and transverse jolt. It has been found that this further control signal $z'$ also permits in many cases an adequate anticipating correction.

In a further alternative it is provided that the further control signal $z''$ be obtained numerically in a differential element which determines the alteration in time terms of the transverse-acceleration-dependent control signal. This permits an even faster determination of the further control signal $z''$. Transverse acceleration and transverse jolt are in this case determined in succession chronologically.

The various features of novelty which characterize the invention are pointed out with particularly in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

Figure 1:
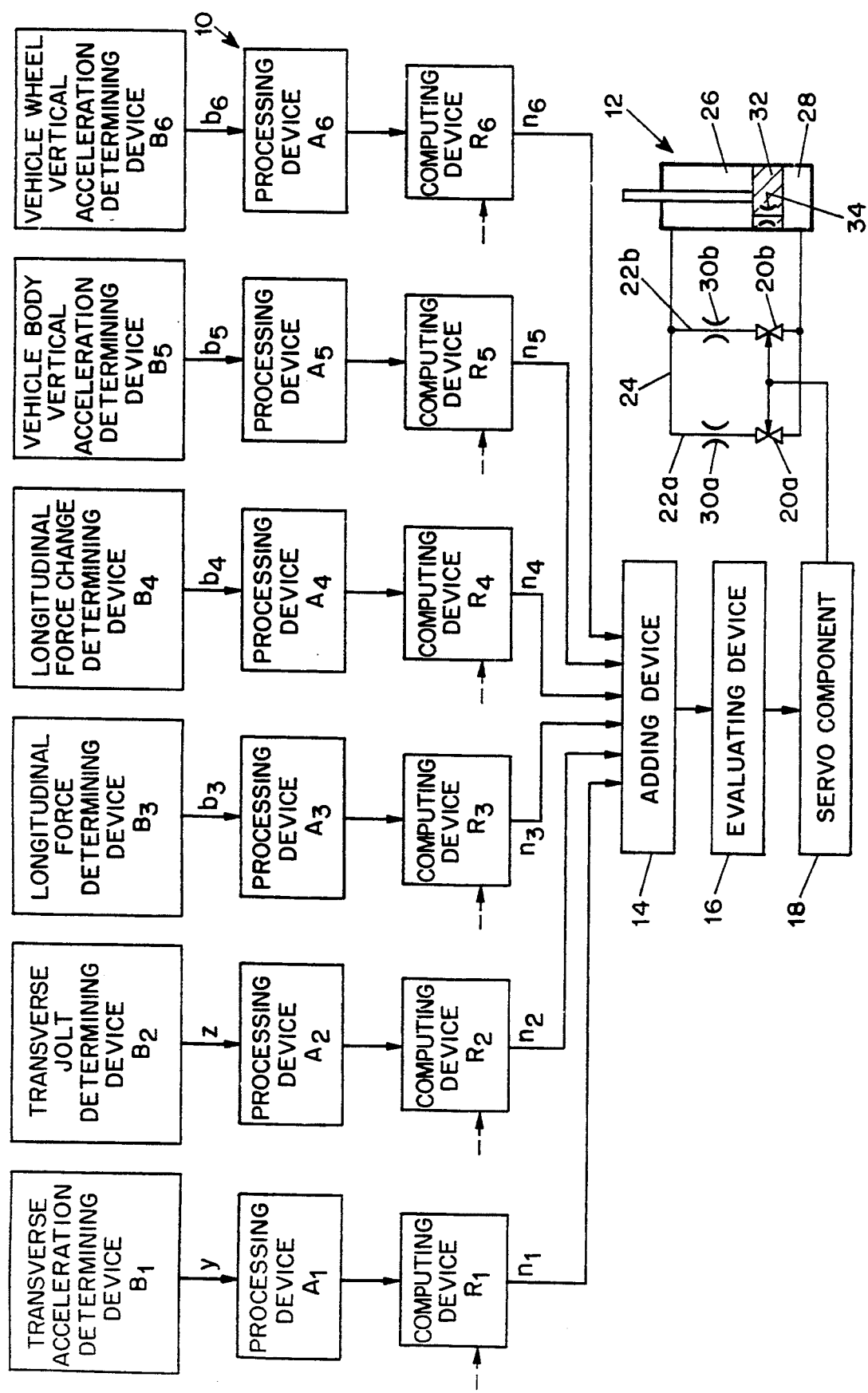
FIG. 1 is a block diagram of the device of the invention for the setting of different damping stages of a motor vehicle shock absorber.

Represented in FIG. 1 is a device hereinafter denoted by 10, for controlling a motor vehicle shock absorber, shown in the form of a block diagram. The device comprises a determination device $B_1$ for the determination of the momentary value "y" of the transverse acceleration acting on the vehicle, and a device $B_2$ for the determination of the momentary value "z", "z'" or "z''" of the transverse jolt. The determination devices $B_1$ and $B_2$ are provided for the detection of rolling motions of the motor vehicle. The device 10 comprises furthermore a device $B_3$ for the determination of the momentary value $b_3$ of the longitudinal force acting on the vehicle, a device $B_4$ for the determination of the momentary value $b_4$ of the alteration of the longitudinal force, a device $B_5$ for the determination of the momentary value $b_5$ of the vertical acceleration of the vehicle body and a device $B_6$ for the determination of the momentary $b_6$ value of the vertical acceleration of the wheels. The devices $B_3$ to $B_6$ are used for the detection of the pitching and lifting motions of the motor vehicle.

The momentary values y, and z, z' or z'', respectively, as well as $b_3$ to $b_6$ are transmitted via processing devices $A_1$ to $A_6$ for the momentary values to computing devices $R_1$ to $R_6$ in which damping need contributions $n_1$ to $n_6$ are determined. The damping need contributions $n_1$ to $n_6$ are added to form an overall damping need value in a summation device 14. An evaluation device 16 determines whether the momentary value of the overall damping need demands another damping stage, in which case a switch-on command is supplied to a servo component 18.

The servo component 18 acts on two electromagnetically actuatable valves 20a and 20b which are provided in two partial paths 22a and 22b of a by-pass 24 extending parallel to each other. The by-pass 24 connects together an upper working space 26 and a lower working space 28 of the shock absorber 12, separated by a piston 32 of the shock absorber 12. The upper working space 26 and the shock absorber 12. The upper working space 26 and the lower working space 28 are joined together via a throttling path 34 provided in the piston 32 of the shock absorber 12. Furthermore, throttling paths 30a and 30b are provided in the partial paths 22a and 22b. By a concerted opening of the valves 20a, 20b the throttling paths 30a, 30b of the by-pass 14 can be connected in parallel in targetted manner with the throttling path 34 in the piston 32 so as, in this way, to alter the damping characteristic of the shock absorber 12.

Hereinunder a closer description will be given of the determination devices provided for the detection of rolling motions of the vehicle, $B_1$ for the momentary value of the transverse acceleration and $B_2$ for the momentary value z, z' or z'' of the transverse jolt.

Figure 2:
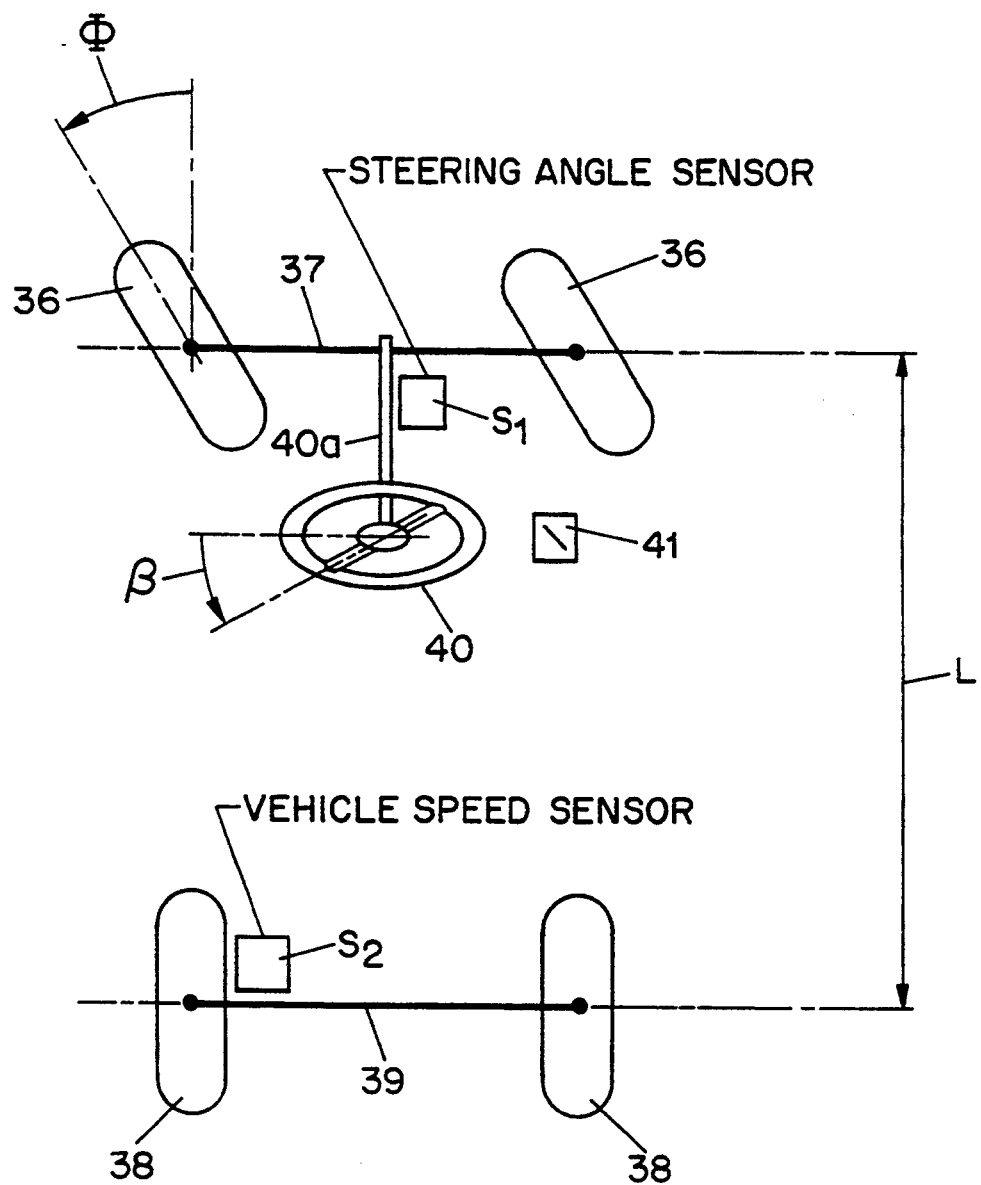
FIG. 2 is an elementary sketch of a vehicle equipped with tachogenerator and steering angle sensor.

FIG. 2 supplies a diagrammatic representation of the parts of a motor vehicle required for a clarification of the above-described determination devices $B_1$ and $B_2$. Front wheels 36 of the motor vehicle mounted in the region of a front axle 37 can be steered by turning a steering wheel 40. On the basis of a steering reduction ratio i there results from a steering angle $\beta$ of the steering wheel 40 an angle of lock $\Phi$ of the front wheels 36 ($\Phi = \beta/i$). Used for the detection of the steering angle $\beta$ of the steering wheel is a steering angle sensor $S_1$ mounted on a steering column 40a of the steering wheel 40. There is provided furthermore in the region of a rear axle 39 with rear wheels 38 of the motor vehicle a vehicle speed sensor $S_2$, for example a tachogenerator, for the detection of the speed of the vehicle. L is the wheelbase of the vehicle, i.e. the distance from the front axle 37 and the rear axle 39.

Figure 3:
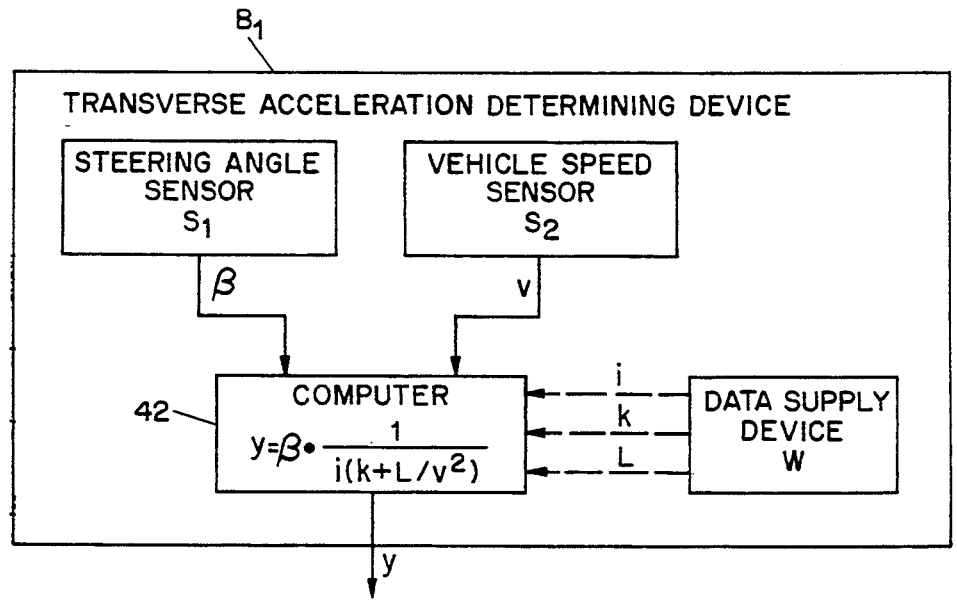
FIGS. 3 to 6 are block diagrams of the devices for the determination of transverse acceleration and transverse jolt.

In FIG. 3 a representation is given in the form of a block diagram of the determination device $B_1$ for the momentary value of the transverse acceleration y. The momentary values of the steering angle $\beta$ or of the vehicle speed v detected by the sensors $S_1$ and $S_2$ are supplied to a computer 42. An additional device W supplies to the computer 42 the values specific to the vehicle: steering reduction ratio i, wheelbase L and a value k which takes into consideration values such as mass of vehicle, tire characteristic diagrams, wheel suspension rigidity and the like. The computer 42 computes from the values of the above-mentioned values the transverse acceleration according to the formula:

$$y = \beta \cdot \frac{1}{i \cdot (k + L/v^2)}$$

The device of the invention can therefore, by a suitable selection of the constant k, be adapted directly to various types of vehicles and equipment. The constant k can here either be preset by the manufacturer of the vehicle, or selected manually by the driver of the vehicle by means of a switch (cf. FIG. 2), e.g., according to the laden condition of the vehicle.

Figure 4:
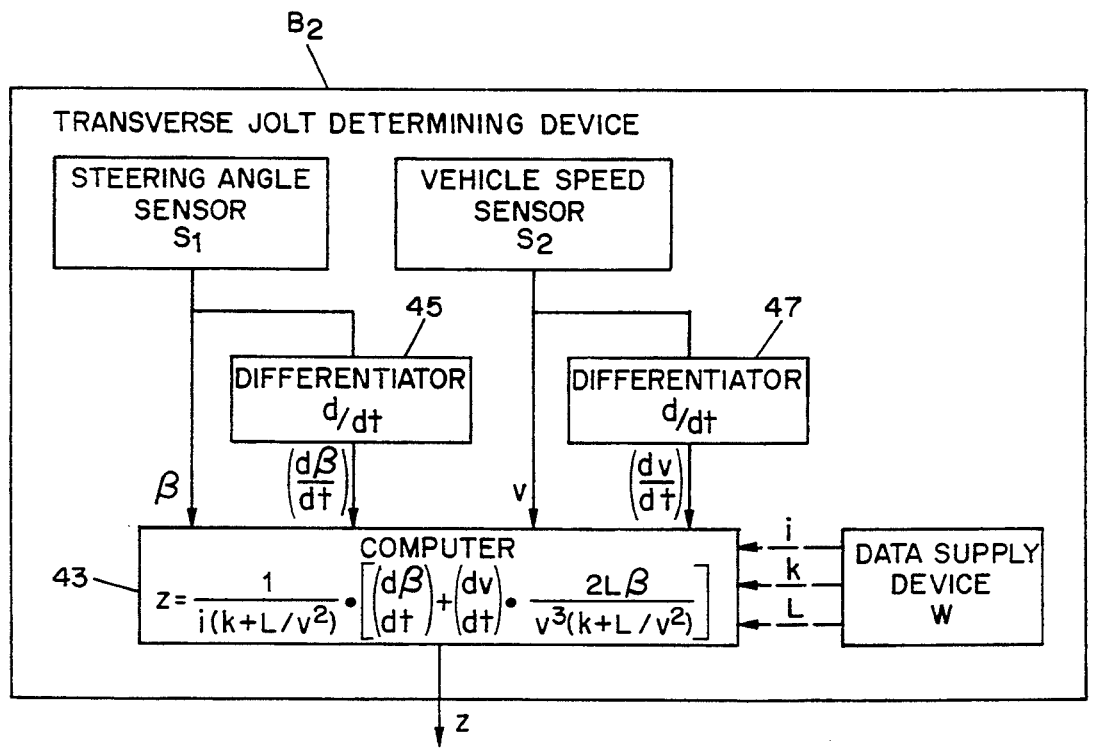

Represented in FIG. 4 in the form of a block diagram is a first form of embodiment of the determination device $B_2$ for the momentary value of the transverse jolt z. In the knowledge of the momentary value of the transverse jolt z it is possible to react quickly to fast steering movements. In the example of embodiment of FIG. 4 the values detected by the angle of lock sensor $S_1$ and by the speed sensor $S_2$ of the steering angle $\beta$ or of the vehicle speed v supplied to a computer 43. In addition, the value of the steering angle $\beta$ is supplied to a differential element 45 which determines the time derivation ($d\beta/dt$) of the steering angle $\beta$ and passes this on to the computer 43. Similarly, the value v of the vehicle speed is supplied to a differential element 47 which determines the time derivation (dv/dt) of the vehicle speed v and passes this on to the computer 43. In addition, the values i, k and L specific to the vehicle are supplied to the computer 43 by the additional device W. The computer 43 computes from the values of the above-mentioned values the momentary value of the transverse jolt z according to the formula:

$$z = \frac{1}{i \cdot (k + L/v^2)} \left[ \left( \frac{d\beta}{dt} \right) + \left( \frac{dv}{dt} \right) \cdot \frac{2 \cdot L \cdot \beta}{v^3 \cdot (k + L/v^2)} \right]$$

Using this formula for the determination of the transverse jolt z affords the advantage that the transverse jolt takes into consideration not only rapid alterations of the angle of lock, but also rapid alterations of the vehicle speed, for example as a consequence of braking at corners.

Figure 5:
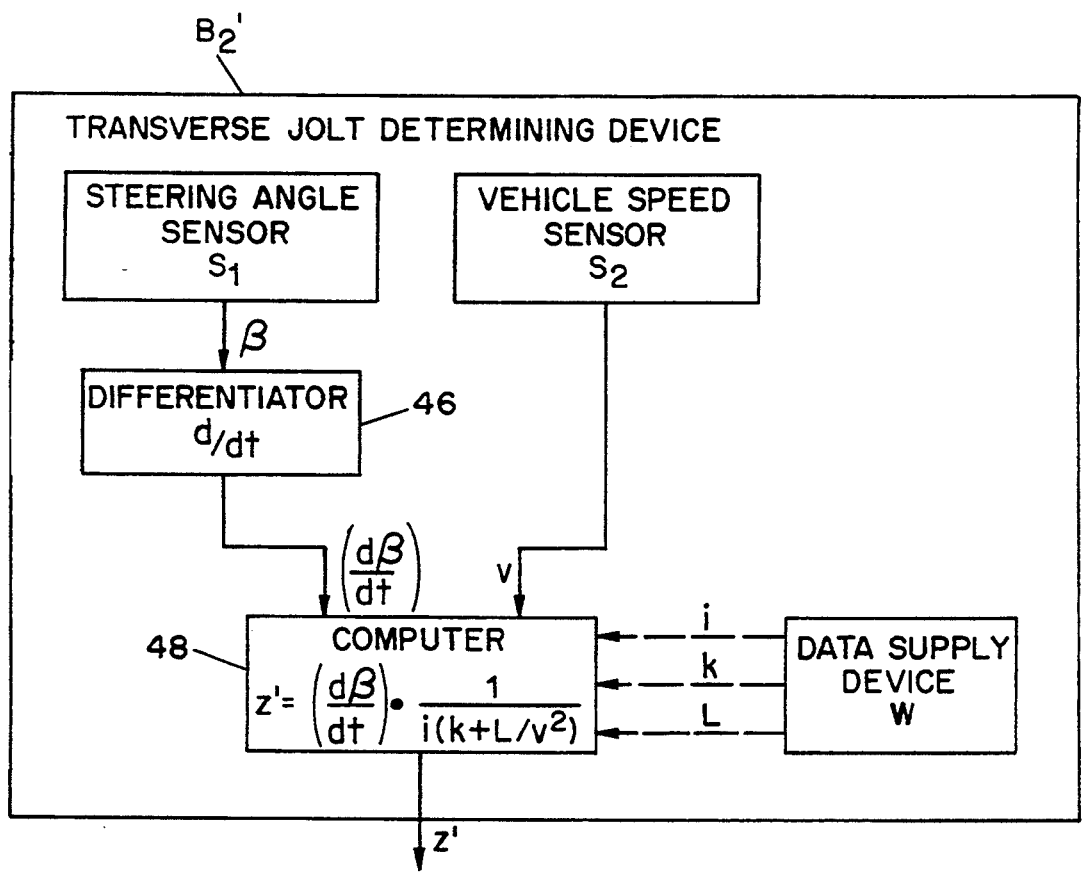

A second form of embodiment of a determination device $B_2'$ for the momentary value of the momentary value of the transverse jolt z' is shown in FIG. 5. In this determination device $B_2'$ the value of the steering angle $\beta$ is supplied to a differential element 46, having been detected by the steering angle sensor $S_1$; the differential element 46 determines the time derivation of the steering angle and supplies it to a computer 48. The value of the vehicle speed v determined by the speed sensor $S_2$ is supplied to the computer 48 directly. In addition, the values i, k and L specific to the vehicle are supplied to the computer 48 by the additional device W. The computer 48 computes from the above-mentioned values the momentary value of the transverse jolt z' according to the formula:

$$z' = \left( \frac{d\beta}{dt} \right) \cdot \frac{1}{i \cdot (k + L/v^2)}$$

This permits a simultaneous and therefore faster determination of transverse acceleration and transverse jolt.

Figure 6:
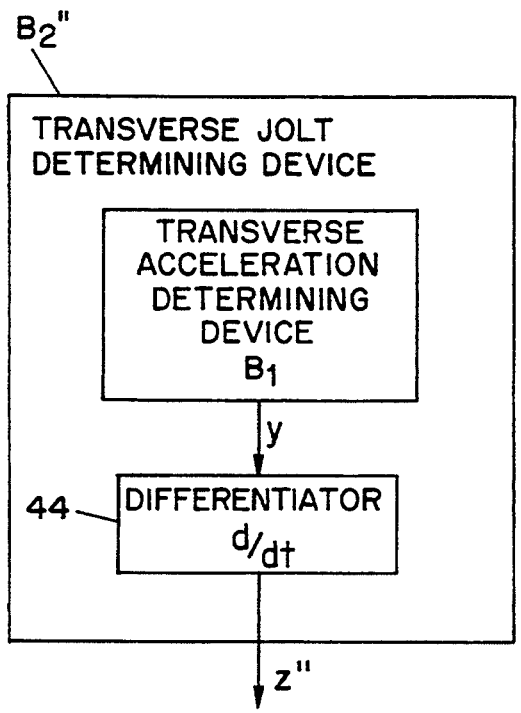

In FIG. 6 a representation is given in the form of a block diagram of a third form of embodiment of the determination device $B_2''$ for the momentary value of the transverse jolt z''. In this form of embodiment the values determined by the determination device $B_1$ for the momentary value of the transverse acceleration y are supplied to a differential element 44 which determines the transverse jolt z'' numerically from the time modification of the transverse acceleration y.

A device has been proposed for the control of a transverse-acceleration-dependent vehicle component, particularly a shock-absorber, dependent upon a control signal representing the transverse acceleration and obtained by means of a computer. In the device of the invention the computer is supplied by a tachogenerator responding to the vehicle speed and by a steering angle sensor responding to a steering lock. The computer is designed for obtaining the control signal taking into consideration values specific to the vehicle, such as mass of vehicle, wheel suspension rigidity and the like.

While specific embodiments of the invention have been shown and described in detail to illustrate the application of the inventive principles, it will be understood that the invention may be embodied otherwise without departing from such principles.

I claim:
1. A device for controlling a vehicle component that is controllable in dependence upon transverse acceleration of and transverse jolt to the vehicle, comprising:
steering angle sensor means for detecting and producing a steering angle signal indicative of the steering angle of the vehicle,
tachogenerator means for detecting and producing a speed signal indicative of the speed of the vehicle,
computer means connected to said steering angle sensor means and said tachogenerator means for receiving and processing said steering angle signal and said speed signal to provide a first control signal representing the transverse acceleration for controlling said vehicle component and derived according to the formula:

$$y = \beta \frac{1}{i(k + L/v^2)}$$

in which y is the value of the first control signal representing the transverse acceleration, $\beta$ is the value of the steering angle signal, v is the value of the speed signal, and i, k and L are constants specific to the vehicle, and a second control signal representing the transverse jolt for controlling said vehicle component derived according to the formula:

$$Z = \frac{1}{i(k + L/v^2)} \left[ \frac{d\beta}{dt} + \frac{dv}{dt} \left( \frac{2L\beta}{v^3(k + L/v^2)} \right) \right]$$

in which z is the value of the second control signal representing the transverse jolt, $\beta$ is the value of the steering angle signal, $d\beta/dt$ is the value of the time derivation of the steering angle signal, v is the value of the speed signal, dv/dt is the value of the time derivation of the speed signal, and i, k and L are constants specific to the vehicle, the computer means having a first differentiator for deriving the value d$\beta$/dt and a second differentiator for deriving the value dv/dt, and vehicle component control means for receiving said first control signal and said second control signal and for controlling the vehicle component in accordance with said first control signal and said second control signal.

2. A device for controlling a vehicle component that is controllable in dependence upon transverse acceleration of and transverse jolt to the vehicle, comprising:

steering angle sensor means for detecting and producing a steering angle signal indicative of the steering angle of the vehicle, tachogenerator means for detecting and producing a speed signal indicative of the speed of the vehicle, computer means connected to said steering angle sensor means and said tachogenerator means for receiving and processing said steering angle signal and said speed signal to provide a first control signal representing the transverse acceleration for controlling said vehicle component and derived according to the formula:

$$y = \beta \frac{1}{i(k + L/v^2)}$$

in which y is the value of the first control signal representing the transverse acceleration, $\beta$ is the value of the steering angle signal, v is the value of the speed signal, and i, k and L are constants specific to the vehicle, and a second control signal representing the transverse jolt for controlling said vehicle component derived according to the formula:

$$z' = \frac{d\beta}{dt} \frac{1}{i(k + L/v^2)}$$

in which z' is the value of the second control signal representing the transverse jolt, d$\beta$/dt is the value of the time derivation of the steering angle signal, v is the value of the speed signal, and i, k and L are constants specific to the vehicle, the computer means having a differentiator for deriving the value d$\beta$/dt, and vehicle component control means for receiving said first control signal and said second control signal and for controlling the vehicle component in accordance with said first control signal and said second control signal.

* * * * *